United States Patent
Hsu

(10) Patent No.: US 7,280,257 B2
(45) Date of Patent: Oct. 9, 2007

(54) DOCUMENT HOLDING FIXTURE

(75) Inventor: Hsiu-O Hsu, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 767 days.

(21) Appl. No.: 09/967,713

(22) Filed: Sep. 27, 2001

(65) Prior Publication Data

US 2003/0058488 A1    Mar. 27, 2003

(51) Int. Cl.
*H04N 1/04* (2006.01)

(52) U.S. Cl. ............. 358/497; 358/474; 358/471

(58) Field of Classification Search .......... 358/497, 358/494, 474, 471, 400, 500, 505, 506, 487, 358/488, 473, 472; 382/312, 313, 318, 319; 250/234–286; 399/211, 379, 380, 212
See application file for complete search history.

(56) References Cited

U.S. PATENT DOCUMENTS

| | | | | |
|---|---|---|---|---|
| 5,548,417 A | * | 8/1996 | Sekimoto et al. | 358/474 |
| 6,208,437 B1 | * | 3/2001 | Neushul | 358/487 |
| 6,233,064 B1 | * | 5/2001 | Griffin | 358/474 |
| 6,433,941 B1 | * | 8/2002 | Onoda | 359/806 |
| 6,661,539 B1 | * | 12/2003 | Nee | 358/474 |
| 6,882,822 B2 | * | 4/2005 | Gomi et al. | 399/380 |

FOREIGN PATENT DOCUMENTS

| JP | 2000156756 A | * | 6/2000 |
|---|---|---|---|
| JP | 2000209409 A | * | 7/2000 |

* cited by examiner

*Primary Examiner*—Cheukfan Lee
(74) *Attorney, Agent, or Firm*—Marger Johnson & McCollom, PC

(57) ABSTRACT

A document holding fixture for a vertical optical scanner. The fixture has a main body, a transparent panel, four linking bars, a document cover panel, and a document backing plate. The document holding fixture uses a simple four linking bar system to maintain a constant parallelism between the document cover panel and the surface of the transparent panel. Weight of the document cover panel provides necessary pressure to press a scan document firmly onto the glass surface of the transparent panel. To facilitate single hand document insertion, a stationing device is used to freeze the document cover panel when the panel reaches a horizontal position.

18 Claims, 6 Drawing Sheets

DOCUMENT HOLDING FIXTURE

BACKGROUND OF THE INVENTION

1. Field of Invention

The present invention relates to a document holding fixture. More particularly, the present invention relates to the document holding fixture for a vertical optical scanner.

2. Description of Related Art

A conventional optical scanner is shown in FIG. 1. The optical scanner has a main body 100 and an upper lid 200. To scan a document 400, the document 400 is placed flat on a horizontal transparent panel 300. The upper lid 200 is lowered onto the document 400 before the document is scanned. However, this type of scanner needs to occupy a relatively large desk area and thus reduces workspace. Furthermore, a horizontal optical scanner is limited by document size.

An effective means of reducing area occupancy and increasing workspace is to design a vertical type of optical scanner. However, one major problem for producing a vertical optical scanner is the provision of an effective document holding fixture.

SUMMARY OF THE INVENTION

Accordingly, one object of the present invention is to provide a document holding fixture that utilizes gravity and a simple four-link mechanism to grip and hold a document such that the document is attached firmly onto a transparent panel.

To achieve these and other advantages and in accordance with the purpose of the invention, as embodied and broadly described herein, the invention provides a document holding fixture for a vertical optical scanner. The vertical optical scanner at least includes a main body and a transparent panel for document placement. The main body has two open slots, one on each side of the transparent panel, so that the transparent panel is held in a vertical position relative to the ground. The document holding fixture includes four linking bars, a cover panel and a backing plate. The four linking bars are parallel to each other. Each linking bar has a first end and a second end. The first end of every pair of linking bars extends into an open slot on the main body and is respectively connected by hinges. The cover panel faces the transparent panel. The cover panel always remains parallel to the transparent panel as the cover panel is moved. The second end of every pair of linking bars is connected to the respective sides of the cover panel by hinges. The backing plate is mounted on the main body at the lower ledge of the transparent panel. The backing plate serves as a support and an alignment base for the document placed next to the transparent panel.

This invention also provides a vertical optical scanner. The vertical optical scanner has a transparent panel, a main body, a scanning module, a transmission device, an electric motor, four linking bars, a cover panel and a backing plate. The transparent panel is perpendicular to the ground and capable of scanning a document. The main body has an open slot on each side of the transparent panel. The scanning module is installed inside the main body. The transmission device inside the main body connects with and drives the scanning module during a scanning operation. The electric motor inside the main body connects with and drives the transmission device. The four linking bars are parallel to each other. Each linking bar has a first end and a second end. The first end of every pair of linking bars extends into an open slot on the main body and is respectively connected by hinges. The cover panel faces the transparent panel. The cover panel always remains parallel to the transparent panel as the cover panel is moved. The second end of every pair of linking bars is connected to the respective sides of the cover panel by hinges. The backing plate is mounted on the main body at the lower ledge of the transparent panel. The backing plate serves as a support and an alignment base for the document placed next to the transparent panel.

One major aspect of this invention is the reduction of floor space due to the deployment of a vertical optical scanner.

A second aspect of this invention is the selection of a simple four linkage parallel mechanism. This mechanism serves to maintain a constant parallelism between the document cover panel and the transparent panel. A scan document is pressed firmly onto the glass surface of the transparent panel by the weight of the document cover.

A third aspect of this invention is the provision of a backing plate to serve as a support and an alignment base for the scan document so that the document is prevented from dropping to the floor.

A fourth aspect of this invention is the provision of a stationing device for maintaining a constant horizontal position that facilitates single hand insertion of a scan document.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
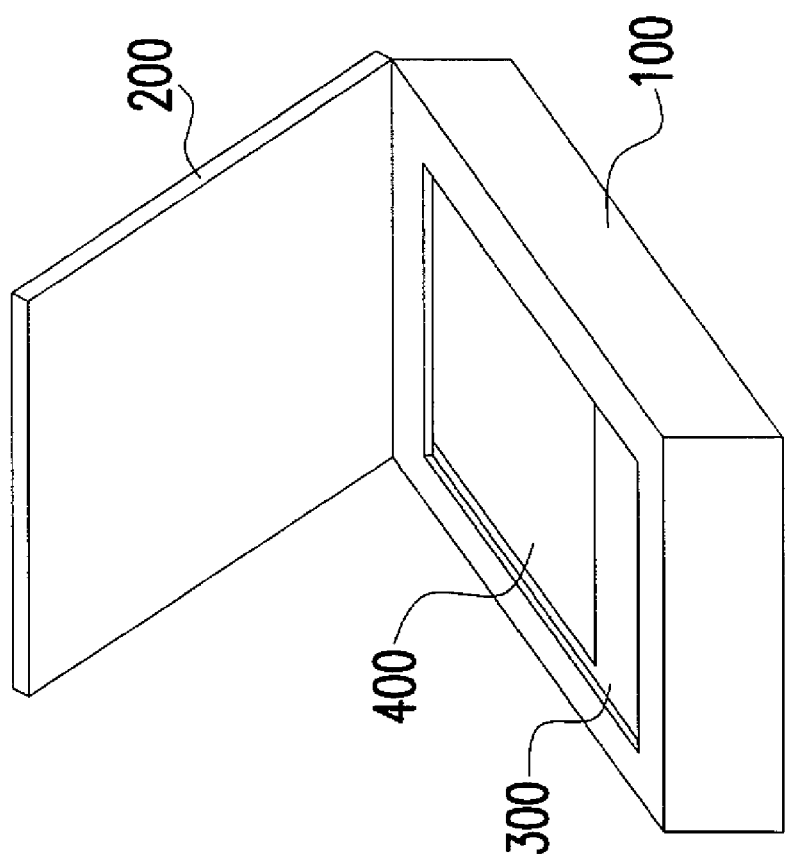
FIG. 1 is a perspective view of a conventional horizontal optical scanner.

Reference will now be made in detail to the present preferred embodiments of the invention, examples of which are illustrated in the accompanying drawings. Wherever possible, the same reference numbers are used in the drawings and the description to refer to the same or like parts.

Figure 2:
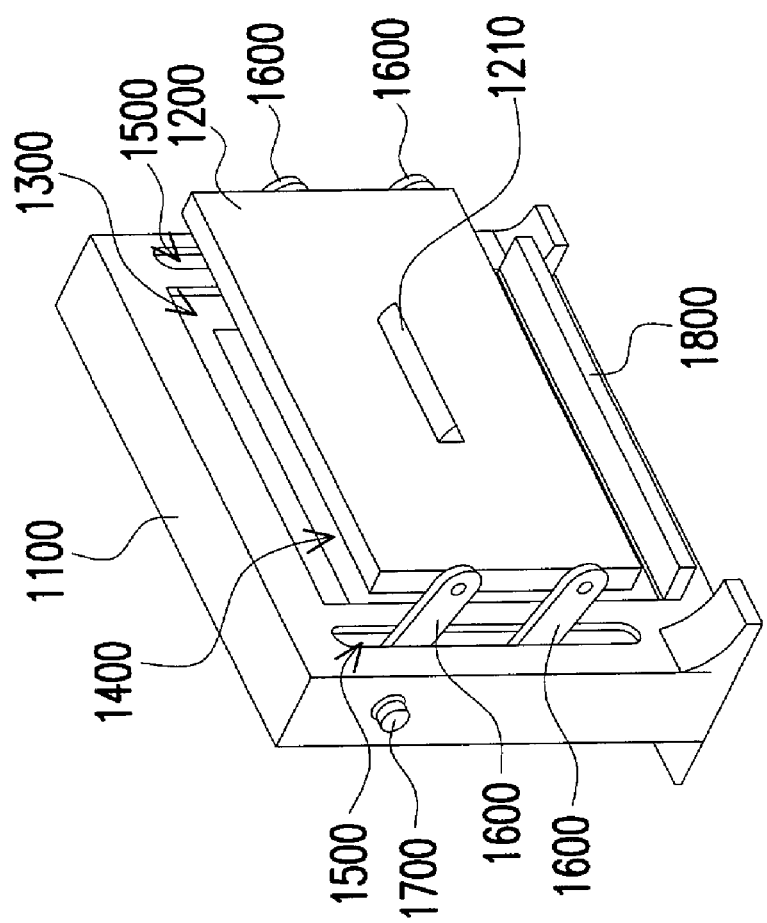
FIG. 2 is a perspective view of a vertical optical scanner according to this invention.
Figure 3:
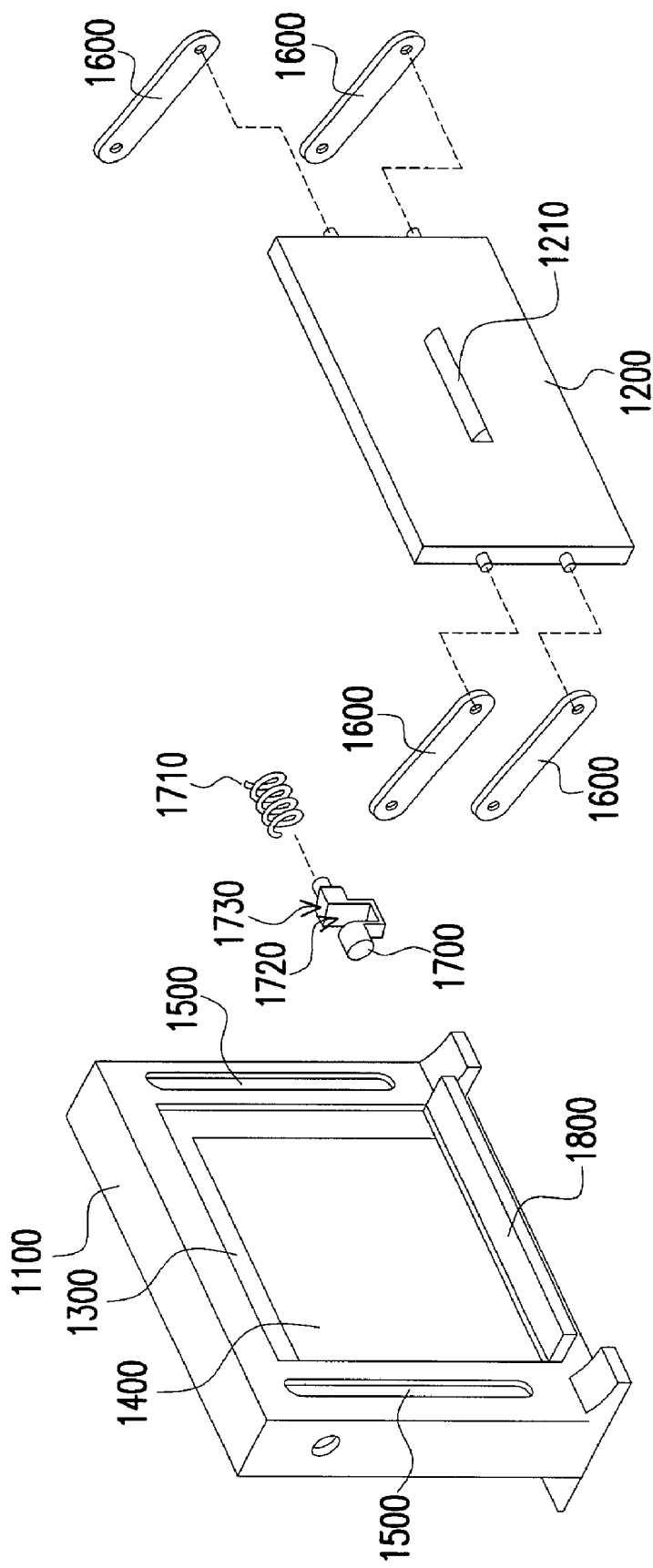
FIG. 3 is an exploded view of all the major components constituting the vertical optical scanner according to this invention.

FIG. 2 is a perspective view of a vertical optical scanner according to this invention. FIG. 3 is an exploded view of all the major components constituting the vertical optical scanner according to this invention. As shown in FIGS. 2 and 3, the vertical optical scanner has a main body 1100. A transparent panel 1300 is on one side of the main body 1100 perpendicular to the floor. The main body 1100 has a guiding slot 1500 on each side. A pair of linking bars 1600 passes through each guiding slot 1500 and fastens to the main body 1100. All four linking bars 1600 are parallel to each other. Each linking bar 1600 is free to move vertically through rotation relative to the point of attachment inside the main body 1100.

The other ends of the four linking bars are attached to the respective sides of a document cover panel 1200. Each linking bar 1600 is free to move vertically through rotation relative to the point of attachment at the document cover panel 1200. Since the four linking bars 1600 are mutually parallel, constant parallelism between the document cover panel 1200 and the transparent panel 1300 can be maintained. Through simultaneous vertical movement of all four linking bars 1600 about their respective pivotal attachment points at the main body 1100 and the document cover panel 1200, the panel 1200 is free to move towards or away from the transparent panel 1300. There is a handle 1210 on the exterior-facing surface of the document cover panel 1200 for lifting up the cover panel 1200.

Figure 5:
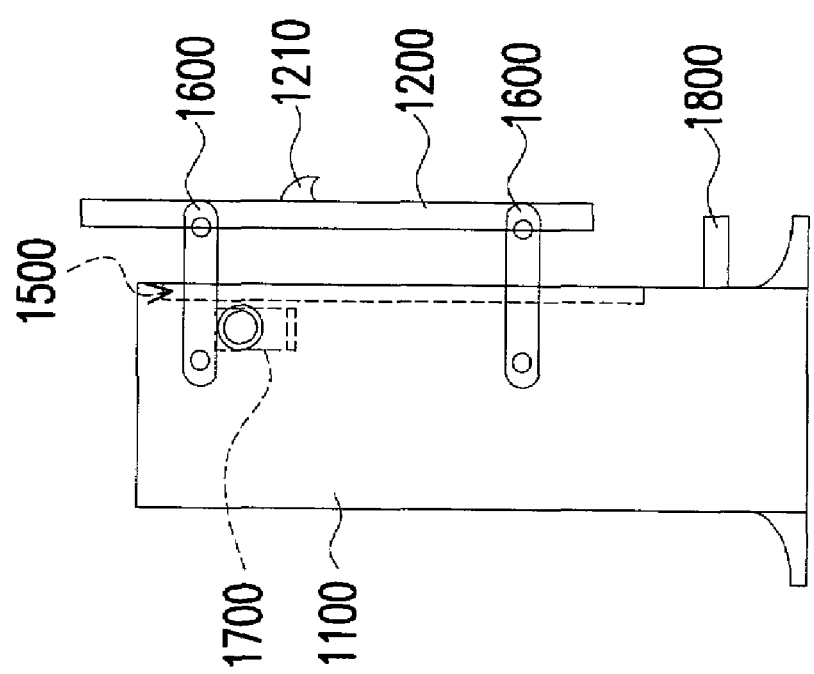
FIG. 5 is a side view showing a lifted document cover panel of the vertical optical scanner according to this invention.
Figure 4:
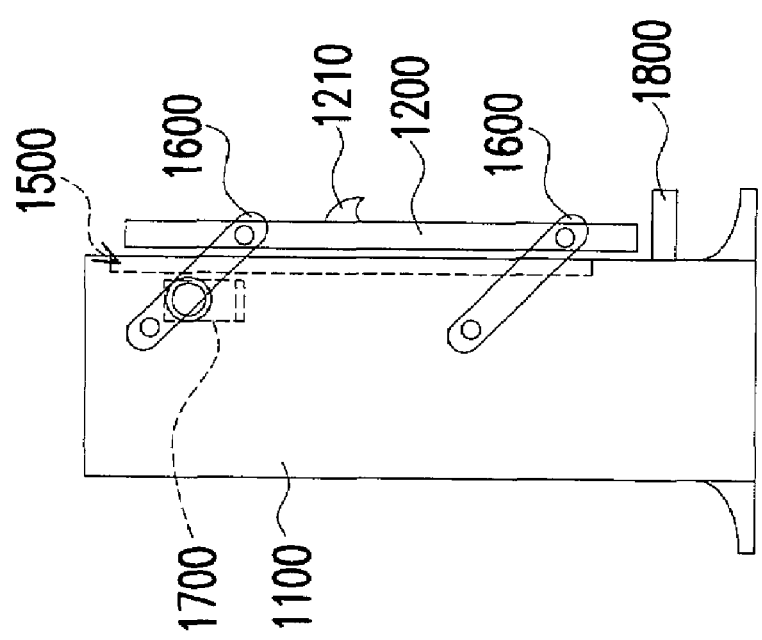
FIG. 4 is a side view showing a lowered document cover panel of the vertical optical scanner according to this invention.

FIG. 4 is a side view showing a lowered document cover panel of the vertical optical scanner according to this invention. Before conducting a scanning operation, the document, a force is applied to the handle 1210 to lift the document cover panel 1200. When the document cover panel 1200 is lifted up to such an extent that the four linking bars 160 are almost horizontal, a spring-loaded lock 1700 mounted on the main body 110 and located next to a pair of linking bars 1600 is employed to station the panel 1200. The spring-loaded lock 1700 has an internal spring 1710 (as shown in FIG. 3) that pushes the lock 1700 outward and latches the linking bars 1600 at a supporting surface 1730 (as shown in FIG. 3). Through this mechanism, the four linking bars 1600 are supported and the document cover panel 1200 is prevented from falling. FIG. 5 is a side view showing a lifted document cover panel of the vertical optical scanner according to this invention. At this point, no force needs to be applied to station the document cover panel 1200. A scan document 1400 may easily slip into the space between the transparent panel 1300 and the document cover panel 1200. Furthermore, there is a backing plate 1800 attached to the lower ledge of the main body 1200 for supporting the scan document 1400 and serving as an alignment base for the document 1400.

After proper positioning of the scan document 1400, the spring-loaded lock 1700 is depressed forcing the linking bars 1600 to dislocate from the supporting surface 1730 and fall into a groove 1720 (as shown in FIG. 3). Due to force of gravity, the document cover panel 1200 drops down bringing the cover panel 1200 back to the previous tight engagement position with the transparent panel 1300 (as shown in FIG. 4). Once the scan document 1400 is firmly pressed against the transparent panel 1300, scanning may begin. To initiate a scanning operation, an electric motor inside the main body 1100 drives a transmission device that carries a scanning module (not shown) to perform necessary scanning of the document 1400 on the transparent panel 1300.

The aforementioned holding device is not limited to the spring-loaded lock 1700. A cam system using a cam 1900 such as the one shown in FIGS. 6a and 6b may be used. Alternatively, a supporting groove 1510 sticking into the guiding slot opening such as the one in FIG. 7 or a spring-lever fastening lock 200 having a structure shown in FIG. 8 may be used instead. In fact, any methods or devices capable of stationing the document cover panel 1200 in a horizontal position can be employed.

Figure 6A:
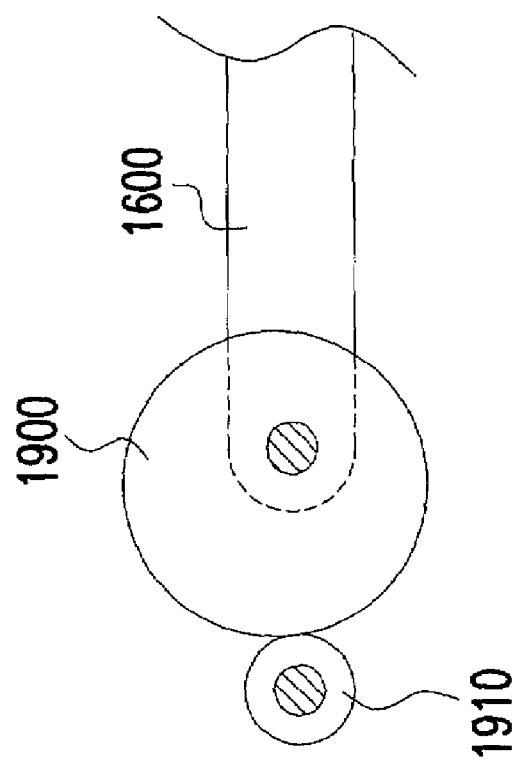
FIGS. 6a and 6b are sketches showing two cam positions for stationing the document cover panel according to this invention.
Figure 6B:
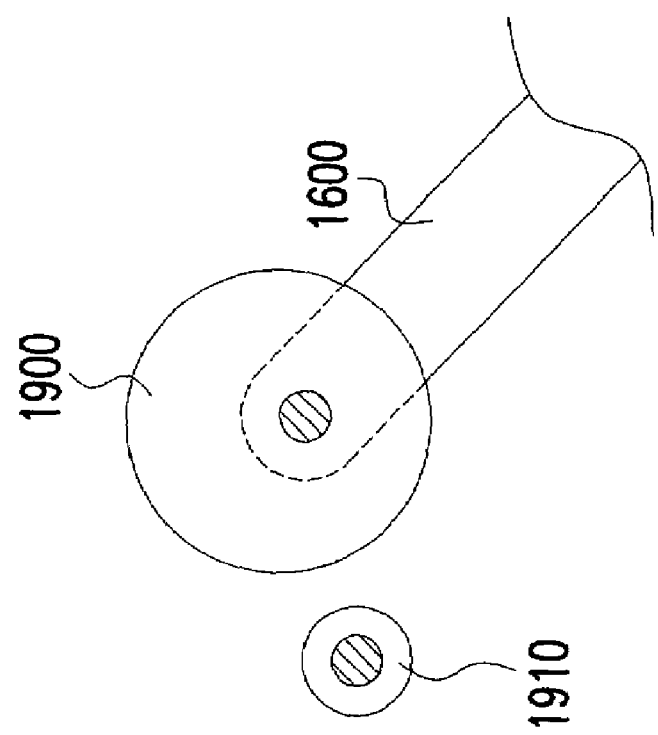
Figure 8:
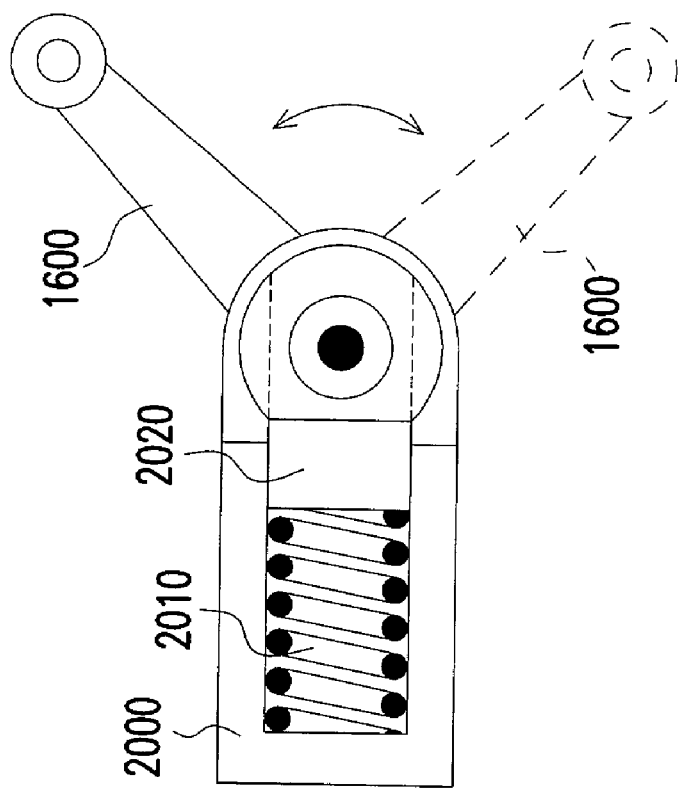
FIG. 8 is a side view showing a spring-loaded lever system for locking the document cover panel according to this invention.
Figure 7:
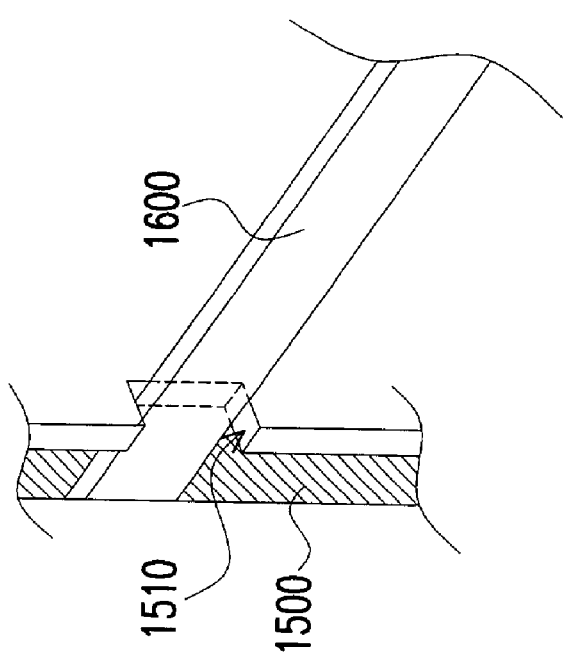
FIG. 7 is a sketch showing an additional stationing device beside the guiding slot opening of the document cover panel.

FIGS. 6a and 6b are sketches showing two cam positions for stationing the document cover panel according to this invention. As shown in FIGS. 6a and 6b, a cam 1900 and a rubber roller 1910 system is mounted at the junction between at least one linking bar 1600 and the main body 1100. When the document cover panel 1200 is lifted from a position shown in FIG. 6a to a position shown in FIG. 6b, the cam 1900 and the roller 1910 are pressed together so that the document cover panel 1200 is held in a horizontal position. FIG. 7 is a sketch showing an additional stationing device beside the guiding slot opening of the document cover panel. As shown in FIG. 7, a supporting groove 1510 is added to the guiding slot opening 1500. When the document cover panel 1200 is lifted to a horizontal position, the linking bars 1600 are moved into the supporting grooves 1510 so that the document cover panel 1200 is held in the horizontal position. FIG. 8 is a side view showing a spring-loaded lever system for locking the document cover panel according to this invention. As shown in FIG. 8, a spring-loaded lever lock 2000 is attached to the junction between the main body 1100 and at least one of the linking bar 1600. The spring-loaded level lock has an internal spring 2010 and a round rod 2020. The spring 2010 pushes against the round rod 2020 so that the movement of the linking bar 1600 from the solid line position to the centerline position is stable. Hence, the document cover panel 1200 can remain in a horizontal position.

In conclusion, major advantages of this invention include:
1. Floor space is reduced because the optical scanner is erected vertically relative to the floor. Furthermore, volume of the optical scanner is not limited by size of the document.
2. A simple four linkage parallel mechanism is used. This mechanism maintains a constant parallelism between the document cover panel and the transparent panel. Weight of the document cover also presses a scan document firmly onto the glass surface of the transparent panel.
3. The handle on the backing plate permits easy lifting of the document cover panel.
4. A stationing device for holding the document cover panel in a horizontal position facilitates single hand insertion of a scan document.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A document holding fixture for a vertical optical scanner having a main body and a transparent panel for placing a document thereon, wherein the transparent panel has two open slots, one on each side thereof, and the transparent panel is positioned vertically with respect to a floor, the document holding fixture comprising:

two pairs of linking bars, wherein the bars of each respective pair are substantially parallel with respect to one another, each linking bar having a first end and a second end, wherein the first ends of each respective pair of linking bars couple to respective sides of the main body;

a cover panel facing the transparent panel placing the cover panel substantially parallel to a face of the transparent panel, wherein each side of the cover panel is attached to the second ends of each respective pair of linking bars; and a backing plate attached to the main body at an edge of the transparent panel.

2. The fixture of claim 1, further including a stationing device for holding the cover panel in a substantially horizontal position.

3. The fixture of claim 2, wherein the stationing device includes:

a spring-loaded lock having a support section and a groove section, wherein the spring-loaded lock has an internal spring at a junction between the main body and the first end of one or more of the linking bars, wherein the spring-loaded lock is adapted to be pushed out by the spring in response to rotation of the linking bar to a horizontal position to enable the support section to support the linkage bar, and wherein the linking bars are configured to drop back onto the groove section and dislodge from the support section when the spring-loaded lock is forced back, and wherein the linking bars are adapted to latch on the groove section to prevent the spring-loaded lock from moving solely by spring pressure.

4. The fixture of claim 2, wherein the stationing device includes:

a roller disposed near a junction between the main body and the first end of the linking bars; and a cam wheel disposed at the junction between the main body and the first end of the linking bars, wherein the cam is adapted to contact the roller so that the cover panel is fixed in a substantially horizontal position in response to the linking bars being substantially horizontal.

5. The fixture of claim 2, wherein the stationing device includes:

a spring-loaded lever lock disposed at the junction between the main body and the first end of any linking bars, wherein as the linking bars are adapted to rotate to a substantially horizontal position, and wherein the spring-loaded lever is adapted to lock the cover panel in a substantially horizontal position.

6. The fixture of claim 2, wherein the stationing device includes:

an additional supporting groove disposed on the open slots, wherein the linking bars are adapted to click into the supporting grooves in response to rotation of the linking bars to a substantially horizontal position to lock the cover panel in a substantially horizontal position.

7. The fixture of claim 1, further including a handle attached to an outer surface of the cover panel.

8. A vertical optical scanner, comprising:

a transparent panel for placing a scan document thereon;

a main body housing the transparent panel and having an open slot on each side;

a scanning module disposed inside the main body;

a transmission component disposed inside the main body and coupled with the scanning module for driving the scanning module during scanning;

an electric motor disposed inside the main body and connected to the transmission component for driving the transmission component;

four parallel linking bars with each linking bar having a first end and a second end, wherein the first end of each pair of linking bars passes through the open slots and attaches to respective sides of the main body;

a cover panel facing the transparent panel, wherein each side of the cover panel is attached to the second end of each respective pair of linking bars; and a backing plate attached to the main body at a lower ledge of the transparent panel, wherein the backing plate serves as a support and an alignment base for the document.

9. The scanner of claim 8, wherein the document holder further includes a stationing device for holding the cover panel in a substantially horizontal position.

10. The scanner of claim 9, wherein the stationing device includes:

a spring-loaded lock having a support section and a groove section, wherein the spring-loaded lock has an internal spring at a junction between the main body and the first end of one or more of the linking bars, wherein the spring-loaded lock is adapted to be pushed out by the spring in response to rotation of the linking bar to a horizontal position to enable the support section to support the linkage bar, and wherein the linking bars are configured to drop back onto the groove section and dislodge from the support section when the spring-loaded lock is forced back, and wherein the linking bars are adapted to latch on the groove section to prevent the spring-loaded lock from moving solely by spring pressure.

11. The scanner of claim 9, wherein the stationing device includes:

a roller disposed near a junction between the main body and the first end of the linking bars; and a cam wheel disposed at the junction between the main body and the first end of the linking bars, wherein the cam is adapted to contact the roller so that the cover panel is fixed in a substantially horizontal position in response to the linking bars being substantially horizontal.

12. The scanner of claim 9, wherein the stationing device includes:

a spring-loaded lever system disposed at the junction between the main body and the first end of any linking bars, wherein as the linking bars are adapted to rotate to a substantially horizontal position, and the spring-loaded lever is adapted to lock the cover panel in a substantially horizontal position.

13. The scanner of claim 9, wherein the stationing device includes:

an additional supporting groove disposed on the open slots, wherein the linking bars are adapted to click into the supporting grooves in response to rotation of the linking bars to a substantially horizontal position to lock the cover panel in a substantially horizontal position.

14. The scanner of claim 8, further including a handle attached to an outer surface of the cover panel.

15. A scanner, comprising:

a body having at least two sides;

a transmission device disposed in the body;

an electric motor disposed in the body to drive the transmission device;

two pairs of linking bars, wherein linking bars of associated pairs are substantially parallel with respect to one another, said linking bars having a first end and a second end, wherein the first ends are coupled to respective sides of the body; and a cover panel having at least two sides, wherein the second ends are coupled to respective sides of the cover panel.

16. The scanner of claim 15, further comprising:

a transparent panel disposed on the body.

17. The scanner of claim 15, wherein the two pairs of linking bars are adapted such that the cover panel is substantially parallel with respect to the body.

18. The scanner of claim 15, further comprising:

at least one roller disposed on the body and coupled to at least one of the linking bars; and at least one cam wheel disposed on the body, wherein the cam wheel is adapted to contact the at least one roller to fix the linking bar in a substantially horizontal position when the linking bar is adapted in a substantially horizontal position.

* * * * *